United States Patent
Sekharan (10) Patent No.: US 10,546,559 B2
(45) Date of Patent: Jan. 28, 2020

(54) MULTI-LAYER RENDERING FOR VISUALIZATIONS

(71) Applicant: Business Objects Software Limited, Dublin (IE)

(72) Inventor: Satishkumar Sekharan, New Westminster (CA)

(73) Assignee: BUSINESS OBJECTS SOFTWARE LIMITED, Dublin (IE)

( * ) Notice: Subject to any disclaimer, the term of this patent is extended or adjusted under 35 U.S.C. 154(b) by 17 days.

(21) Appl. No.: 14/980,307

(22) Filed: Dec. 28, 2015

(65) Prior Publication Data

US 2017/0186405 A1 Jun. 29, 2017

(51) Int. Cl.
*G09G 5/377* (2006.01)
*G06T 11/20* (2006.01)
*G06T 11/60* (2006.01)
*G09G 5/391* (2006.01)

(52) U.S. Cl.
CPC ............ *G09G 5/377* (2013.01); *G06T 11/206* (2013.01); *G06T 11/60* (2013.01); *G09G 5/391* (2013.01)

(58) Field of Classification Search
CPC ............ G01C 21/3626; G01C 21/3632; G01C 21/3635; G01C 21/3667; G01C 21/3682; G01C 21/3673; G01C 21/3694; G06T 17/05; G06T 15/005; G06T 11/20; G06T 11/203; G06T 11/206; G06T 1/20; G06T 1/60; G06T 2207/20021; G06T 2210/32; G09B 29/10; G09B 29/00; G09B 29/005; G09B 29/006; H04N 19/172; H04N 19/136; H04N 19/423; G06F 3/048;
(Continued)

(56) References Cited

U.S. PATENT DOCUMENTS

2003/0081006 A1* 5/2003 Sheldon ................ G06F 3/0481
715/781
2005/0285876 A1* 12/2005 Balaga .................... G06T 17/05
345/629

(Continued)

OTHER PUBLICATIONS

Quora, What is difference between HTML and HTML5? Do they build on each other or can one simply just learn HTML5 as it becomes more frequent in web development?, Written Aug. 29, 2013, updated Aug. 24, 2014, on quora.com, 3 pages, downloaded from http://www.quora.com on Mar. 9, 2017.*

(Continued)

*Primary Examiner* — Haixia Du
(74) *Attorney, Agent, or Firm* — Lam P. Doan; Fountainhead Law Group PC (57) ABSTRACT

Some embodiments provide a non-transitory machine-readable medium that stores a program executable by at least one processing unit of a device. The program receives data associated with a visual presentation that includes several visual elements. The program also identifies a first set of visual elements in the several visual elements having a first type and a second set of visual elements in the several visual elements having a second type. The program further renders the first set of visual elements in a first layer of the visual presentation using a first rendering engine. The program also renders the second set of visual elements in a second layer of the visual presentation using a second rendering engine.

20 Claims, 8 Drawing Sheets

(58) Field of Classification Search
CPC ..... G06F 3/04842; G06F 17/212; G06K 9/46; G06K 9/00456; G06K 9/38; G09G 2340/14; G09G 5/026
See application file for complete search history.

(56) References Cited

U.S. PATENT DOCUMENTS

2013/0321456 A1* 12/2013 Hultquist ........... G01C 21/3667
345/629
2016/0247051 A1* 8/2016 Vrhel ..................... G06T 11/60

OTHER PUBLICATIONS

Fairhead, Stop chasing screen resolutions, posted Dec. 3, 2012 on WebDesignerDepot.com, 13 pages, downloaded from http://www.webdesignerdepot.com/2012/12/stop-chasing-screen-resolutions/ on Mar. 10, 2017.*

* cited by examiner

MULTI-LAYER RENDERING FOR VISUALIZATIONS

BACKGROUND

Recent advancements in computing technology has enabled large amounts of data to be collected, stored, and/or analyzed. Such data may be represented in a visual presentation (e.g., charts, graphs, maps, diagrams, etc.) in order to understand the data in an easier and quicker manner. For instance, visual presentations of enterprise data may be used to view and understand company operations, finances, performance, etc.

In many instances, visual presentations based on large amounts of data may include large numbers of visual elements. Rendering the visual elements in such visual presentations may take a long time. In addition, responsiveness to manipulations of such visual presentations may be slow. In some cases, the quality of such visual presentations may be compromised for performance.

SUMMARY

In some embodiments, a non-transitory machine-readable medium stores a program executable by at least one processing unit of a device. The program receives data associated with a visual presentation that includes several visual elements. The program also identifies a first set of visual elements in the several visual elements having a first type and a second set of visual elements in the several visual elements having a second type. The program further renders the first set of visual elements in a first layer of the visual presentation using a first rendering engine. The program also renders the second set of visual elements in a second layer of the visual presentation using a second rendering engine.

In some embodiments, the program further identifies a third set of visual elements in the several visual elements having a third type. The program also determines a number of visual elements in the third set of visual elements. When the number of visual elements in the third set of visual elements is not greater than a threshold number of visual elements, the program renders the third set of visual elements in the first layer of the visual presentation using the first rendering engine. When the number of visual elements in the third set of visual elements is greater than the threshold number of visual elements, the program renders the third set of visual elements in the second layer of the visual presentation using the second rendering engine.

In some embodiments, the first rendering engine is a vector-based rendering engine and the second rendering engine is a raster-based rendering engine. The program may also determine whether the device is a mobile computing device. When the device is determined to be a mobile computing device, the program uses a first type of raster-based rendering engine as the second rendering engine. When the device is determined to not be a mobile computing device, the program uses a second type of raster-based rendering engine as the second rendering engine. In some embodiments, the program further determines whether a resolution of a display of the device is less than a threshold resolution amount. When the resolution of the display of the device is determined to be less than the threshold resolution amount, the program uses a first type of raster-based rendering engine as the second rendering engine. When the resolution of the display of the device is determined to be not less than the threshold resolution amount, the program uses a second type of raster-based rendering engine as the second rendering engine.

In some embodiments, the first set of visual elements having the first type includes one-dimensional visual elements and the second set of visual elements having the second type includes two-dimensional visual elements. The second set of visual elements having the second type may further include text-based visual elements.

In some embodiments, a method receives data associated with a visual presentation that includes several visual elements. The method also identifies a first set of visual elements in the several visual elements having a first type and a second set of visual elements in the several visual elements having a second type. The method further renders the first set of visual elements in a first layer of the visual presentation using a first rendering engine. The method also renders the second set of visual elements in a second layer of the visual presentation using a second rendering engine.

In some embodiments, the method further identifies a third set of visual elements in the several visual elements having a third type. The method also determines a number of visual elements in the third set of visual elements. When the number of visual elements in the third set of visual elements is not greater than a threshold number of visual elements, the method renders the third set of visual elements in the first layer of the visual presentation using the first rendering engine. When the number of visual elements in the third set of visual elements is greater than the threshold number of visual elements, the method renders the third set of visual elements in the second layer of the visual presentation using the second rendering engine.

In some embodiments, the first rendering engine is a vector-based rendering engine and the second rendering engine is a raster-based rendering engine. The method may also determine whether the device is a mobile computing device. When the device is determined to be a mobile computing device, the method uses a first type of raster-based rendering engine as the second rendering engine. When the device is determined to not be a mobile computing device, the method uses a second type of raster-based rendering engine as the second rendering engine. In some embodiments, the method further determines whether a resolution of a display of the device is less than a threshold resolution amount. When the resolution of the display of the device is determined to be less than the threshold resolution amount, the method uses a first type of raster-based rendering engine as the second rendering engine. When the resolution of the display of the device is determined to be not less than the threshold resolution amount, the method uses a second type of raster-based rendering engine as the second rendering engine.

In some embodiments, the first set of visual elements having the first type includes one-dimensional visual elements and the second set of visual elements having the second type includes two-dimensional visual elements. The second set of visual elements having the second type may further include text-based visual elements.

In some embodiments, a system includes a layer rendering manager configured to receive data associated with a visual presentation that includes several visual elements. The layer rendering manager is also configured to identify a first set of visual elements in the several visual elements having a first type and a second set of visual elements in the several visual elements having a second type. The system also includes a first rendering engine configured to render the first set of visual elements in a first layer of the visual presentation. The system further includes a second rendering engine configured to render the second set of visual elements in a second layer of the visual presentation.

In some embodiments, the layer rendering manager is further configured to identify a third set of visual elements in the several visual elements having a third type and determine a number of visual elements in the third set of visual elements. The first rendering engine may be further configured to render the third set of visual elements in the first layer of the visual presentation when the layer rendering manager determines that the number of visual elements in the third set of visual elements is not greater than a threshold number of visual elements. The second rendering engine may be further configured to render the third set of visual elements in the second layer of the visual presentation when the layer rendering manager determines that the number of visual elements in the third set of visual elements is greater than the threshold number of visual elements.

In some embodiments, the first rendering engine is a vector-based rendering engine and the second rendering engine is a raster-based rendering engine. The second rendering engine may be a first type of raster-based rendering engine and the layer rendering manager may be further configured to determine whether the device is a mobile computing device. The second rendering engine may be further configured to render the second set of visual elements in the second layer of the visual presentation when the layer rendering manager determines that the device is a mobile computing device. The system may further include a third rendering engine that is a second type of raster-based rendering engine configured to render the second set of visual elements in the second layer of the visual presentation when the layer rendering manager determines that the device is not a mobile computing device.

In some embodiments, the second rendering engine is a first type of raster-based rendering engine. The layer rendering manager may be further configured to determine whether a resolution of a display of the device is less than a threshold resolution amount. The second rendering engine may be further configured to render the second set of visual elements in the second layer of the visual presentation when the layer rendering manager determines that the resolution of the display of the device is less than the threshold resolution amount. The system may further include a third rendering engine that is a second type of raster-based rendering engine configured to render the second set of visual elements in the second layer of the visual presentation when the layer rendering manager determines that the resolution of the display of the device is not less than the threshold resolution amount. In some embodiments, the first set of visual elements having the first type include one-dimensional visual elements, wherein the second set of visual elements having the second type includes two-dimensional visual elements.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for rendering multi-layer visual presentations. In some embodiments, different rendering engines are used to render different visual elements of a visual presentation in different layers of the visual presentation. Different rendering engines are used to render the visual elements of the visual presentation based on different factors. For instance, different rendering engines may be used to render the visual elements based on the type of device on which the visual presentation is to be viewed. As another example, different rendering engines may be used to render the visual elements based on the resolution of a display of a device on which the visual presentation is to be viewed. In some embodiments, a visual presentation includes different types of visual elements. In some such embodiments, different rendering engines may be used to render the visual elements based on the number of visual elements of a certain type(s) in the visual presentation.

Figure 1:
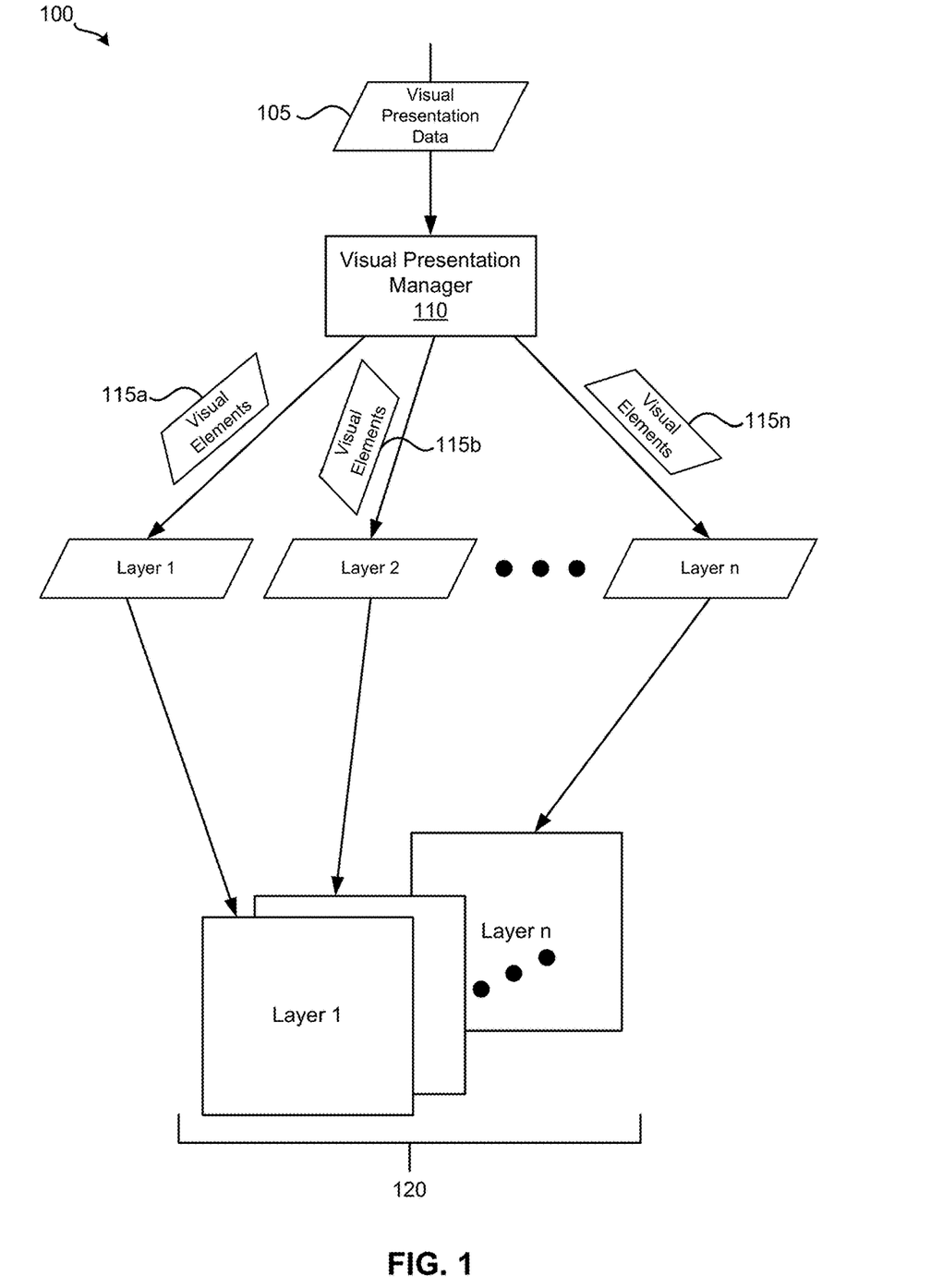
FIG. 1 illustrates a data flow of a multi-layer rendering of a visual presentation according to some embodiments.

FIG. 1 illustrates a data flow 100 of a multi-layer rendering of a visual presentation according to some embodiments. As shown, data flow 100 includes visual presentation data 105, visual presentation manager 110, visual elements 115a-n, layers 1-n, and visual presentation 120.

Visual presentation data 105 includes data that describes visual presentation 120. In some embodiments, visual presentation 120 includes a number of visual elements. Visual presentation data 105 includes, in some such embodiments, data for each visual element that specifies a type of the visual element and a set of coordinates that represent the relative position of the visual element in visual presentation 120. Examples of visual presentations may include value driver trees (VDTs), relational data models, return on invested capital (ROIC) trees, etc., or any other type of visual presentation that may include a large number of visual elements. In some embodiments, visual presentation data 105 is stored in a JavaScript object notation (JSON) data structure. One of ordinary skill in the art will appreciate that visual presentation data 105 may be stored in any type of data structure in some embodiments.

Visual presentation manager 110 is responsible for generating visual presentation 120 based on visual presentation data 105. Visual presentation manager 110 may render different visual elements specified in visual presentation data 105 in different layers of visual presentation 120. For this example, visual elements 115a-n represent visual elements of visual presentation 120 that are defined in visual presentation data 105. As illustrated, visual presentation manager 110 renders visual elements 115a in layer 1 of visual presentation 120, visual elements 115b in layer 2 of visual presentation 120, etc.

In some embodiments, visual presentation manager 110 renders different visual elements in different layers of visual presentation 120 based on the type of the visual elements. Examples of visual element types include text-based visual elements, one-dimensional visual elements (e.g., lines), two-dimensional visual elements (e.g., circles, ovals, ellipses, triangles, rectangles, squares, trapezoids, hexagons, octagons, etc.), three-dimensional visual elements (e.g., spheres, cones, cubes, cylinders, pyramids, etc.), image-based visual elements, etc. One of ordinary skill in the art will realize that any number of additional and/or different types of visual elements are possible.

Visual presentation manager 110 may render several different types of visual elements in a particular layer. For instance, visual elements 115*a* may include one-dimensional visual elements as well as text-based visual elements. One of ordinary skill in the art will understand that visual presentation manager 110 may render any number of different types of visual elements in each different layer of visual presentation 120. For example, visual presentation manager 110 may render two different types of visual elements in layer 1, one type of visual element in layer 2, four different types of visual elements in layer 3, etc.

In some embodiments, visual presentation manager 110 renders different layers of visual presentation 120 using different rendering engines. For instance, visual presentation manager 110 may render visual elements 115*a* in layer 1 using a raster-based rendering engine, visual elements 115*b* in layer 2 using a vector-based rendering engine, etc. In some embodiments, visual presentation manager 110 uses different rendering engines to render visual elements having a particular type based on different factors. For instance, visual presentation manager 110 may use different rendering engines to render visual elements having a particular type based on the type of device on which visual presentation 120 is viewed. In some cases of such an example, visual presentation manager 110 uses a first type of raster-based rendering engine (e.g., an HTML5 rendering engine or an HTML5 canvas rendering engine) to render visual elements having a particular type when the type of device on which visual presentation 120 is viewed is a mobile device (e.g., a mobile phone, a smartphone, a tablet device, etc.). When the type of device on which visual presentation 120 is viewed is not a mobile device, visual presentation manager 110 uses a second type of raster-based rendering engine (e.g., an HTML rendering engine) to render visual elements having the particular type.

In some embodiments, visual presentation manager 110 may use different rendering engines to render visual elements having a particular type based on the resolution of a display of a device on which the visual presentation is viewed. For example, visual presentation manager 110 may use the first type of raster-based rendering engine (e.g., an HTML5 rendering engine or an HTML5 canvas rendering engine) to render visual elements having a particular type when the resolution of the display of the device on which visual presentation 120 is viewed is less than a threshold resolution amount (e.g., 3,500 total pixels, 4,000 total pixels, 4,500 total pixels, etc.). When the resolution of the display of the device on which visual presentation 120 is viewed is not less than the threshold resolution amount, visual presentation manager 110 may use the second type of raster-based rendering engine (e.g., an HTML rendering engine) to render visual elements having the particular type. As another example, visual presentation manager 110 may use a raster-based rendering engine (e.g., an HTML5 rendering engine or an HTML5 canvas rendering engine) to render visual elements having a particular type when the resolution of the display of the device on which visual presentation 120 is viewed is less than the threshold resolution amount and may use a vector-based rendering engine (e.g., a WebGL rendering engine) to render visual elements having the particular type when the resolution of the display of the device on which visual presentation 120 is viewed is not less than the threshold resolution amount.

In some embodiments, different rendering engines may be used to render the visual elements based on the number of visual elements having a particular type in the visual presentation. For instance, visual presentation manager 110 may use a raster-based rendering engine to render visual elements having a particular type when the number of such visual elements is greater than a threshold number of visual elements (e.g., 1,500 visual elements, 2,000 visual elements, 2,500 visual elements, etc.). When the number of such visual elements is not greater than the threshold number of visual elements, visual presentation manager 110 may use a vector-based rendering engine to render the visual elements having the particular type. As another example, visual presentation manager 110 may use a first type of vector-based rendering engine (e.g., a WebGL rendering engine) to render visual elements having a particular type when the number of such visual elements is greater than the threshold number of visual elements and may use a second type of vector-based rendering engine (e.g. an SVG rendering engine) to render the visual elements having the particular type when the number of such visual elements is not greater than the threshold number of visual elements.

As shown in FIG. 1, layers 1-*n* are layers of visual presentation 120. In some embodiments, visual presentation 120 is a web document (e.g., an HTML document) that is viewable through a web browser application. As such, layers 1-*n* are layers of a web document in some such embodiments. For example, layer 1 may be a hypertext markup language (HTML) layer, layer 2 may be a scalable vector graphics (SVG) layer, layer 3 may be an HTML5 layer, layer 4 may be a web graphics library (WebGL) layer, etc.

Figure 2:
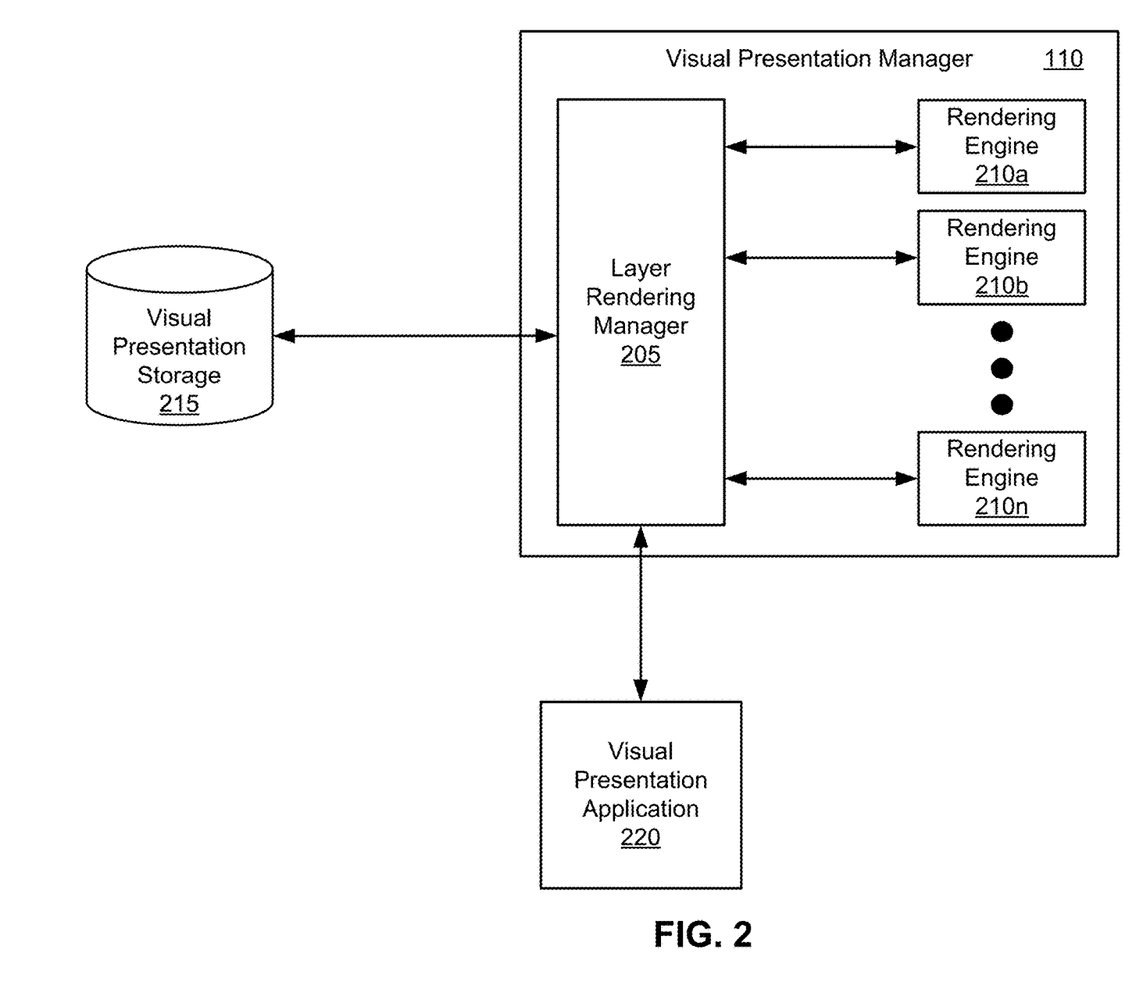
FIG. 2 illustrates an architecture of a visual presentation manager according to some embodiments.

FIG. 2 illustrates an architecture of a visual presentation manager 110 according to some embodiments. As shown, visual presentation manager 110 includes layer rendering manager 205 and rendering engines 210*a-n*. Layer rendering manager 205 manages the rendering of layers of multi-layer visual presentations (e.g., visual presentation 120). For example, layer rendering manager 205 may receive a request from visual presentation application 220 to render a visual presentation. In response to such a request, layer rendering manager 205 sends a request to visual presentation storage 215, which is configured to store visual presentation data (e.g., visual presentation data 105) of visual presentations, for data associated with the requested visual presentation. In response, layer rendering manager 205 receives the requested data from visual presentation storage 215. In some embodiments, layer rendering manager 215 retrieves the data associated with the requested visual presentation from visual presentation storage 215. In some embodiments, the data associated with the visual presentation is stored in a JSON data structure.

To render the requested visual presentation, layer rendering manager 205 may identify sets of visual elements for rendering in different layers of the visual presentation. In some embodiments, layer rendering manager 205 identifies different sets of visual elements for rendering in different layers based on the types of the visual elements of the visual presentation. For instance, layer rendering manager 205 may identify first set of text-based visual elements for rendering in a first layer, a second set of one-dimensional visual elements for rendering in a second layer, a third set of two-dimensional visual elements for rendering in a third layer, etc. Layer rendering manager 205 may identify several different types of visual elements for rendering in a particular layer of the visual presentation. For example, layer rendering manager 205 may identify two-dimensional visual elements as well as text-based visual elements for rendering in a single layer of the visual presentation.

Figure 3A:
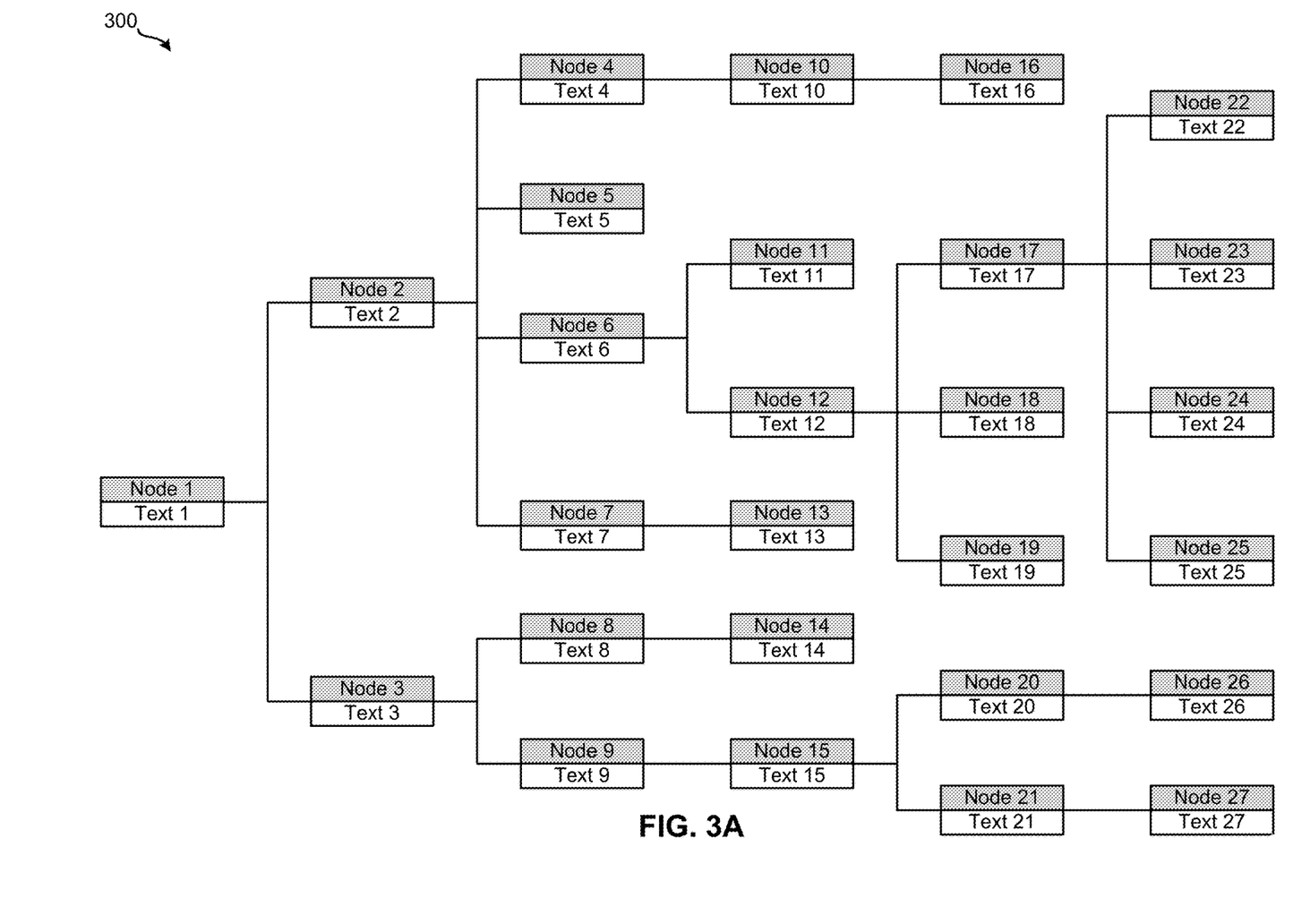
FIGS. 3A-3C illustrates a visual presentation according to some embodiments.
Figure 3B:
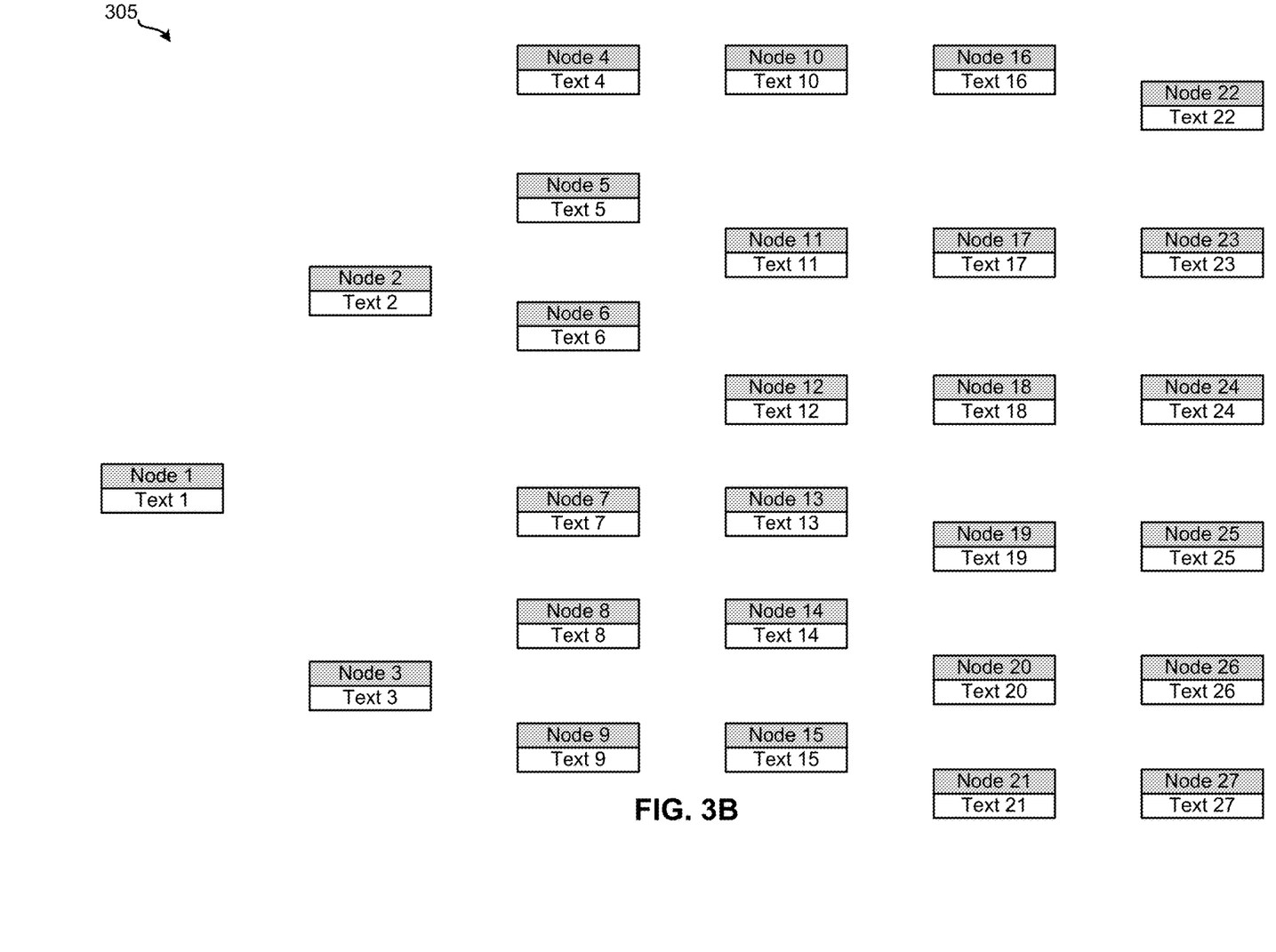
Figure 3C:
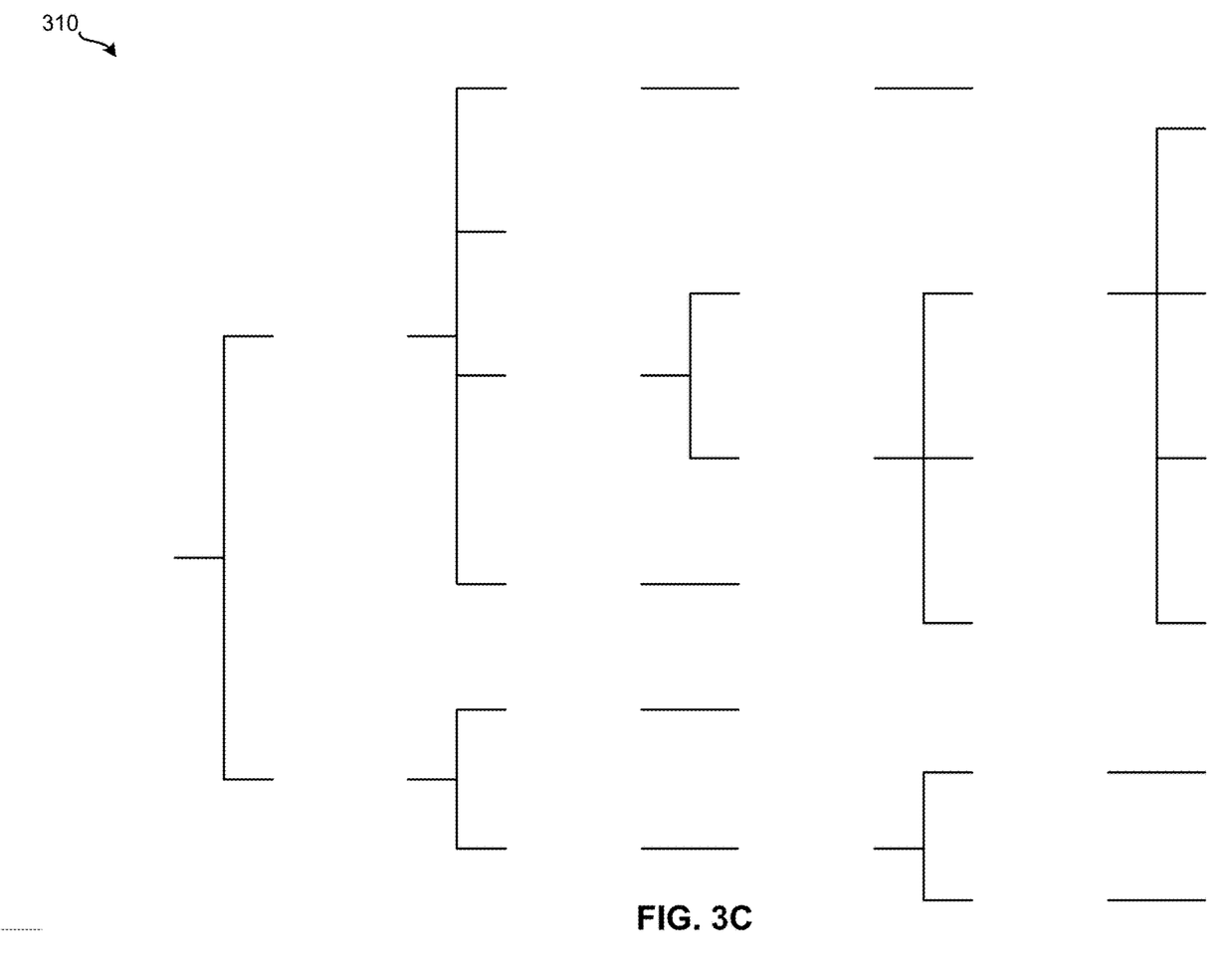

Referring to FIGS. 3A-3C as an example, FIGS. 3A-3C illustrates a visual presentation 300 according to some embodiments. Specifically, FIG. 3A illustrates visual presentation 300 and FIGS. 3B and 3C illustrate two layers that form visual presentation 300. In this example, visual presentation 300 is a simplified hierarchical tree diagram (e.g., a value driver tree, a ROIC tree, etc.) that includes nodes 1-27. As shown in FIG. 3A, each node includes two-dimensional visual elements (rectangles in this example) and a text-based visual element (labels for nodes 1-27 and text 1-27 in this example). In addition, nodes 1-27 are connected to each other via one-dimensional visual elements (lines in this example).

For this example, layer rendering manager 205 identifies two-dimensional visual elements and text-based visual elements for rendering in a first layer of visual presentation 300. FIG. 3B illustrates such a layer 305 of visual presentation 300. As shown, layer 305 of visual presentation 300 includes the two-dimensional visual elements and text-based visual elements (the rectangles and labels of nodes 1-27 in this example) of visual presentation 300. Continuing with the above example, layer rendering manager 205 identifies one-dimensional visual elements for rendering in a second layer of visual presentation 300. FIG. 3C illustrates such a layer 310 of visual presentation 300. As shown, layer 310 of visual presentation 300 includes the one-dimensional visual elements (the lines connecting nodes 1-27 in this example) of visual presentation 300.

Returning to FIG. 2, layer rendering manager 205 may render different layers of a visual presentation using different rendering engines (e.g., a raster-based rendering engine (e.g., an HTML5 rendering engine, an HTML5 canvas rendering engine, an HTML rendering engine, a WebGL rendering engine, etc.), a vector-based rendering engine, (e.g., an SVG rendering engine), etc.). Referring to FIGS. 3B and 3C as an example, layer rendering manager 205 renders layer 305 of visual presentation 300 using a raster-based rendering engine and renders layer 310 of visual presentation 30 using a vector-based rendering engine. In addition, layer rendering manager 205 may use different rendering engines to render visual elements having a particular type based on the different factors explained above (e.g., based on the type of device on which the visual presentation is viewed, based on the resolution of the display of the device on which the visual presentation is viewed, based on the number of visual elements having the particular type, etc.).

Upon identifying a set of visual elements of the visual presentation for rendering in a layer of the visual presentation and determining a rendering engine 210 to render the set of visual elements, layer rendering manager 205 sends the set of visual elements to the determined rendering engine 210 for rendering. Once layer rendering manager 205 has identified all the visual elements in the visual presentation and received the different rendered layers of visual elements from rendering engines 210a-n, layer rendering manager 205 generates the visual presentation based on the rendered layers of visual elements. Layer rendering manager 205 then sends the generated visual presentation to visual presentation application 220 for viewing.

In this example, visual presentation application 220 is an application configured to display visual presentations rendered by visual presentation manager 110. In some embodiments, visual presentation application 220 is a web browser application. In some embodiments, visual presentation manager 110 is an application module that is part of visual presentation application 220 operating on a device. In other embodiments, visual presentation manager 110 and visual presentation application 220 are separate applications operating on a device.

Rendering engines 210a-n are configured to render visual elements in a layer of a visual presentation. Each rendering engine 210 may receive a request from layer rendering manager 205 to render a set of visual elements in a layer of the visual presentation. In some embodiments, the request includes data associated with each visual element that specifies a type of the visual element and a set of coordinates that represent the relative position of the visual element in the visual presentation. Based on such data, rendering engine 210 renders the specified visual elements in a layer of the visual presentation and sends the layer to layer rendering manager 205. Rendering engines 210a-n may each be any number of different types of rendering engines (e.g., a raster-based rendering engine (e.g., an HTML5 rendering engine, an HTML5 canvas rendering engine, an HTML rendering engine, etc.), a vector-based rendering engine (e.g., an SVG rendering engine, a WebGL rendering engine, etc.), etc.).

Figure 4A:
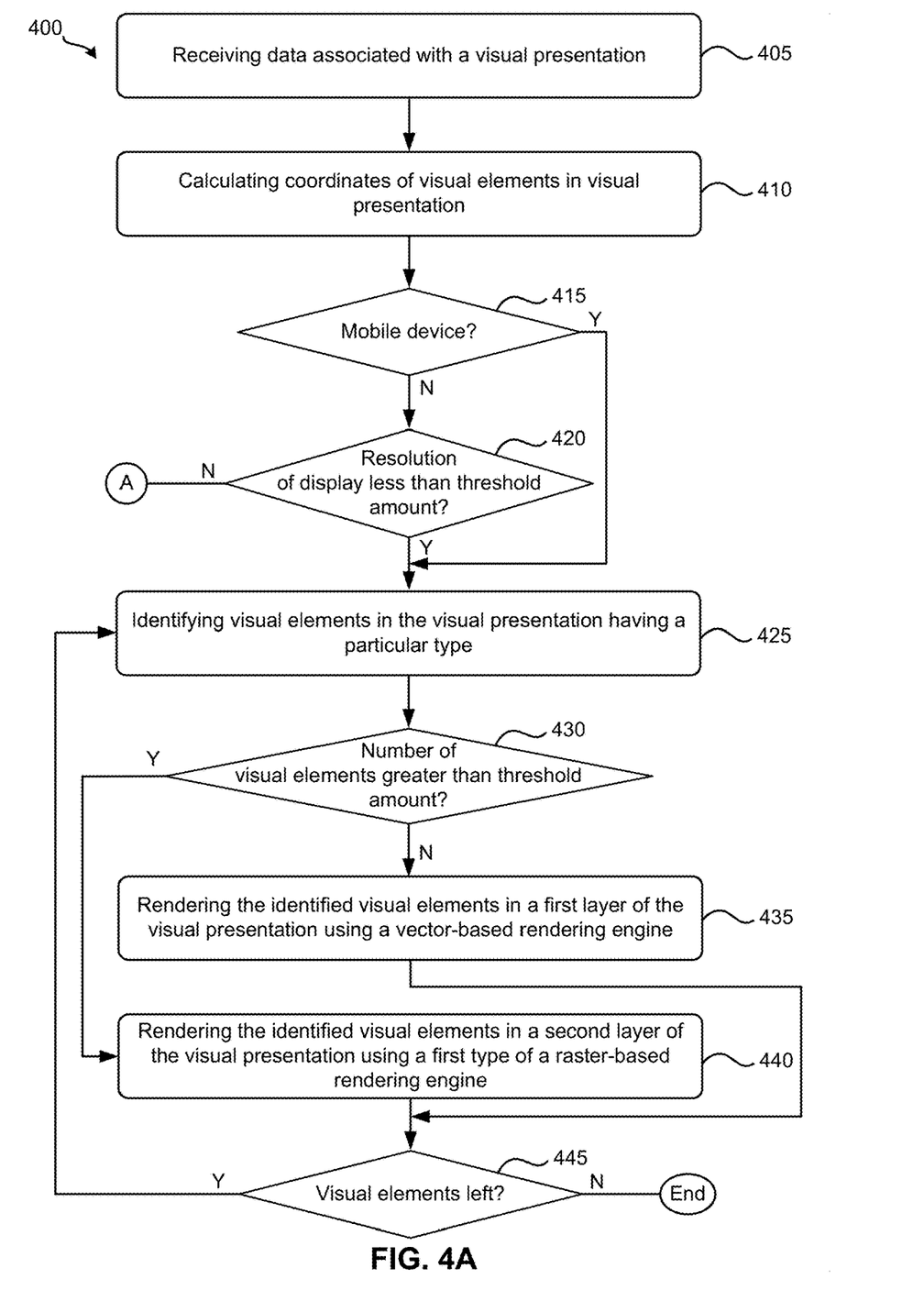
FIGS. 4A and 4B illustrate a process 400 for rendering a multi-layer visual presentation according to some embodiments.
Figure 4B:
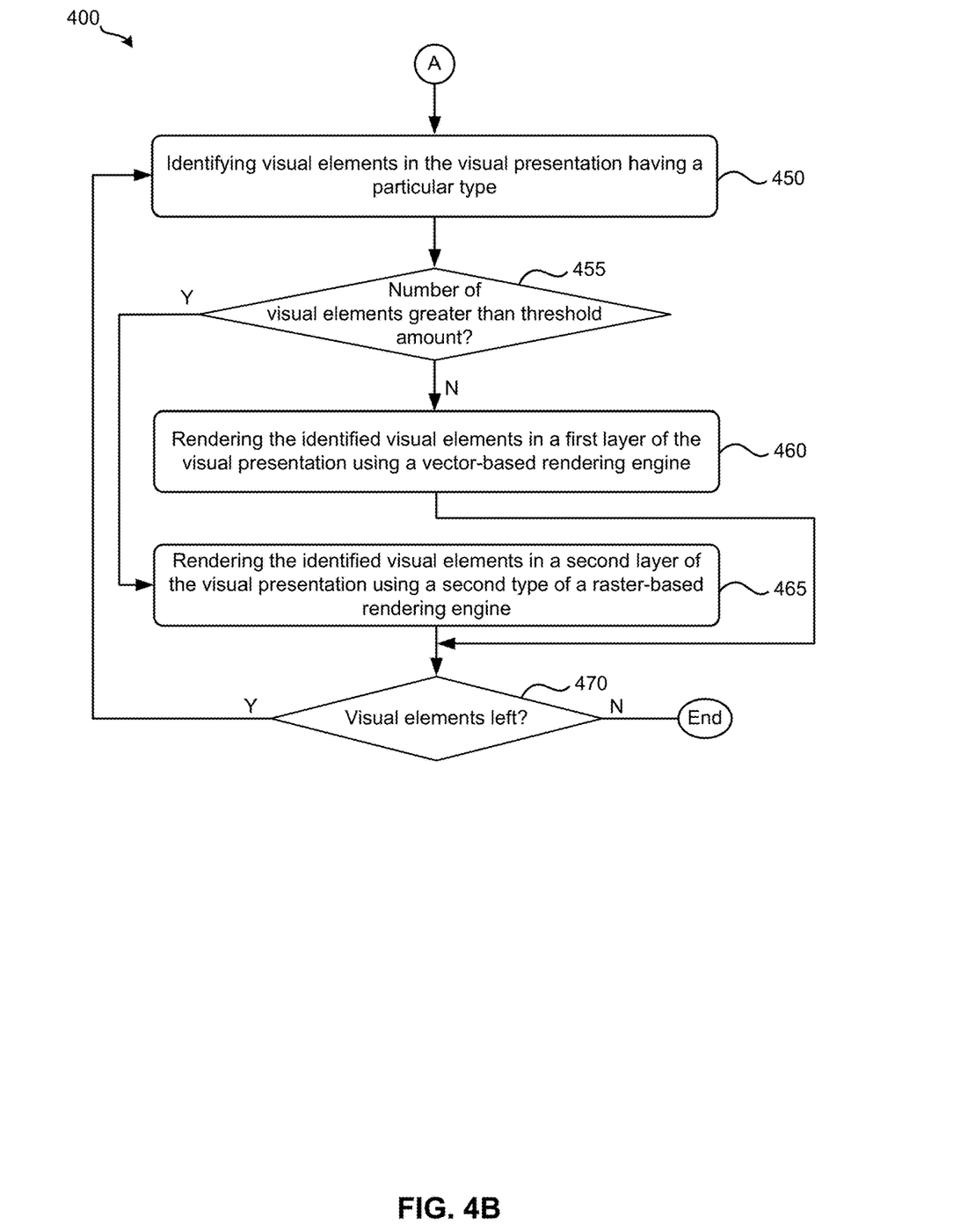

FIGS. 4A and 4B illustrate a process 400 for rendering a multi-layer visual presentation according to some embodiments. In some embodiments, a visual presentation manager (e.g., visual presentation manager 110) performs process 400. Process 400 starts by receiving, at 405, data associated with a visual presentation. Referring to FIG. 2 as an example, visual presentation manager 110 may receive data associated with a visual presentation from visual presentation storage 215. Visual presentation manager 110 may receive the data in response to receiving a request from visual presentation application 220 to render the visual presentation.

Next, process 400 calculates, at 410, coordinates of visual elements in the visual presentation. In some embodiments, the data associated with the visual presentation includes data for each visual element that specifies a type of the visual element and a set of coordinates that represent the relative position of the visual element in the visual presentation. Based on the sets of coordinates for the visual elements, process 400 calculates coordinate of visual elements in the visual presentation. In some embodiments, process 400 uses different techniques to calculate the coordinates of visual elements of different types of layouts. For example, process 400 may use a tree rendering algorithm (e.g., a Reingold-Tilford "tidy" algorithm) to calculate the coordinates of visual elements of a hierarchical tree layout (e.g. visual presentation 300).

Process 400 then determines, at 415, whether a device on which the visual presentation is viewed is a mobile device (e.g., a mobile phone, a smartphone, a tablet device, etc.). If process 400 determines that the device on which the visual presentation is viewed is a mobile device, process 400 proceeds to 425. Otherwise, process 400 continues to 420.

At 420, process 400 determines whether the resolution of a display of the device on which the visual presentation is viewed is less than a threshold resolution amount. If the resolution of the display of the device on which the visual presentation is viewed is less than the threshold resolution amount, process 400 continues to 425. Otherwise, process 400 proceeds to 450.

Process 400 identifies, at 425, visual elements in the visual presentation having a particular type. As mentioned above, examples of visual element types may include text-based visual elements, one-dimensional visual elements (e.g., lines), two-dimensional visual elements (e.g., circles, ovals, ellipses, triangles, rectangles, squares, trapezoids, hexagons, octagons, etc.), three-dimensional visual elements (e.g., spheres, cones, cubes, cylinders, pyramids, etc.), image-based visual elements, etc. Referring to FIG. 2 as an example, layer rendering manager 205 may perform operation 425 to identify visual elements having the particular type.

Next, process 400 determines, at 430, whether the number of identified visual elements is greater than a threshold number of visual elements. If the number of identified visual elements is greater than the threshold number of visual elements, process 400 proceeds to 440. Otherwise, process 400 continues to 435. Referring to FIG. 2 as an example, layer rendering manager 205 may perform operation 430 to determine whether the number of identified visual elements is greater than the threshold number of visual elements.

At 435, process 400 renders the identified visual elements in a first layer of the visual presentation using a vector-based rendering engine (e.g., an SVG rendering engine). Once the identified visual elements are render in the first layer of the visual presentation, process 400 proceeds to 445. Referring to FIG. 2 as an example, a rendering engine 210 (e.g., rendering engine 210*a*) may perform operation 435 to determine whether the number of identified visual elements is greater than the threshold number of visual elements.

At 440, process 400 renders the identified visual elements in a second layer of the visual presentation using a first type of a raster-based rendering engine (e.g., an HTML5 rendering engine). Once the identified visual elements are render in the second layer of the visual presentation, process 400 proceeds to 445. Referring to FIG. 2 as an example, a rendering engine 210 (e.g., rendering engine 210*b*) may perform operation 440 to determine whether the number of identified visual elements is greater than the threshold number of visual elements.

Process 400 determines, at 445, whether any visual elements in the visual presentation are left to process. If there are visual elements left to process, process 400 returns to 425 to continue processing remaining visual elements in the visual presentation. Otherwise, process 400 ends. Referring to FIG. 2 as an example, layer rendering manager 205 may perform operation 445 to determine whether any visual elements are left to process.

At 450, process 400 identifies visual elements in the visual presentation having a particular type. As explained above, examples of visual element types may include text-based visual elements, one-dimensional visual elements (e.g., lines), two-dimensional visual elements (e.g., circles, ovals, ellipses, triangles, rectangles, squares, trapezoids, hexagons, octagons, etc.), three-dimensional visual elements (e.g., spheres, cones, cubes, cylinders, pyramids, etc.), image-based visual elements, etc. Referring to FIG. 2 as an example, layer rendering manager 205 may perform operation 450 to identify visual elements having the particular type.

Process 400 then determines, at 455, whether the number of identified visual elements is greater than a threshold number of visual elements. If the number of identified visual elements is greater than the threshold number of visual elements, process 400 proceeds to 465. Otherwise, process 400 continues to 460. Referring to FIG. 2 as an example, layer rendering manager 205 may perform operation 455 to determine whether the number of identified visual elements is greater than the threshold number of visual elements.

At 460, process 400 renders the identified visual elements in a first layer of the visual presentation using a vector-based rendering engine (e.g., an SVG rendering engine). Once the identified visual elements are render in the first layer of the visual presentation, process 400 proceeds to 470. Referring to FIG. 2 as an example, a rendering engine 210 (e.g., rendering engine 210*a*) may perform operation 460 to determine whether the number of identified visual elements is greater than the threshold number of visual elements.

At 465, process 400 renders the identified visual elements in a second layer of the visual presentation using a second type of a raster-based rendering engine (e.g., an HTML rendering engine). Once the identified visual elements are render in the second layer of the visual presentation, process 400 proceeds to 470. Referring to FIG. 2 as an example, a rendering engine 210 (e.g., rendering engine 210*n*) may perform operation 465 to determine whether the number of identified visual elements is greater than the threshold number of visual elements.

Process 400 then determines, at 470, whether any visual elements in the visual presentation are left to process. If there are visual elements left to process, process 400 returns to 450 to continue processing remaining visual elements in the visual presentation. Otherwise, process 400 ends. Referring to FIG. 2 as an example, layer rendering manager 205 may perform operation 470 to determine whether any visual elements are left to process.

After process 400 ends, the rendered visual presentation may be viewed. Referring to FIG. 2 as an example, visual presentation manager 110 may send the rendered visual presentation to visual presentation application 220 for visual presentation application 220 to display the visual presentation on a device on which visual presentation application 220 is operating.

Figure 5:
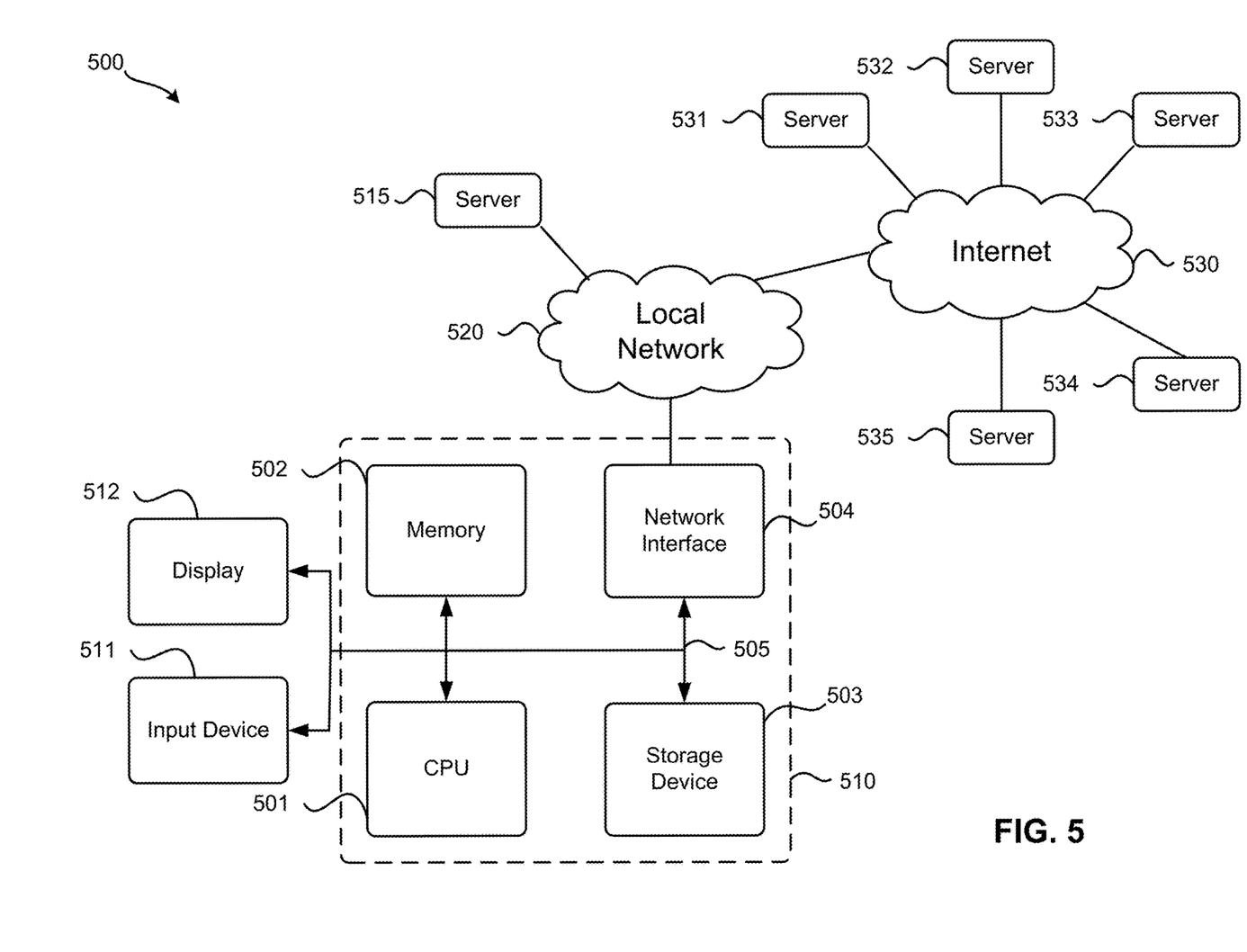
FIG. 5 illustrates an exemplary computer system according to some embodiments.

An exemplary computer system 500 is illustrated in FIG. 5. Computer system 510 includes a bus 505 or other communication mechanism for communicating information, and a processor 501 coupled with bus 505 for processing information. Computer system 510 also includes memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
   receiving data associated with a visual presentation comprising a hierarchical tree that includes a plurality of nodes and a plurality of paths connecting the plurality of nodes;
   rendering the plurality of paths of the hierarchical tree in a first layer of the visual presentation using a first rendering engine;
   determining whether the device is a mobile computing device;
   when the device is determined to be a mobile computing device, rendering the plurality of nodes of the hierarchical tree in a second layer of the visual presentation using a second rendering engine; and
   when the device is determined to not be a mobile computing device, rendering the plurality of nodes of the hierarchical tree in the second layer of the visual presentation using a third rendering engine.

2. The non-transitory machine-readable medium of claim 1, wherein the program further comprises sets of instructions for:
   identifying a set of visual elements in the plurality of visual elements having a type;
   determining a number of visual elements in the set of visual elements;
   when the number of visual elements in the set of visual elements is determined to be not greater than a threshold number of visual elements, rendering the set of visual elements in the first layer of the visual presentation using the first rendering engine;
   when the number of visual elements in the set of visual elements is determined to be greater than the threshold number of visual elements and the device is determined to be a mobile computing device, rendering the set of visual elements in the second layer of the visual presentation using the second rendering engine; and
   when the number of visual elements in the set of visual elements is determined to be greater than the threshold number of visual elements and the device is determined to not be a mobile computing device, rendering the set of visual elements in the second layer of the visual presentation using the third rendering engine.

3. The non-transitory machine-readable medium of claim 2, wherein the set of visual elements comprises text-based visual elements.

4. The non-transitory machine-readable medium of claim 3, wherein the set of visual elements are visual elements within the nodes of the hierarchical tree.

5. The non-transitory machine-readable medium of claim 1, wherein the first rendering engine is a vector-based rendering engine, the second rendering engine is a first raster-based rendering engine, and the third rendering engine is a second raster-based rendering engine.

6. The non-transitory machine-readable medium of claim 1, wherein the program further comprises sets of instructions for:
   determining whether a resolution of a display of the device is less than a threshold resolution amount;
   the resolution of the display of the device is determined to be less than the threshold resolution amount, rendering the plurality of nodes of the hierarchical tree in the second layer of the visual presentation using the second rendering engine; and
   the resolution of the display of the device is determined to be not less than the threshold resolution amount, rendering the plurality of nodes of the hierarchical tree in the second layer of the visual presentation using the third rendering engine.

7. The non-transitory machine-readable medium of claim 6, wherein the second rendering engine is a hypertext markup language 5 (HTML5) rendering engine and the third rendering engine is a hypertext markup language (HTML) rendering engine other than the HTML5 rendering engine.

8. For a device, a method comprising:
   receiving data associated with a visual presentation comprising a hierarchical tree that includes a plurality of nodes and a plurality of paths connecting the plurality of nodes;
   rendering the plurality of paths of the hierarchical tree in a first layer of the visual presentation using a first rendering engine;
   determining whether the device is a mobile computing device;

when the device is determined to be a mobile computing device, rendering the plurality of nodes of the hierarchical tree in a second layer of the visual presentation using a second rendering engine; and when the device is determined to not be a mobile computing device, rendering the plurality of nodes of the hierarchical tree in the second layer of the visual presentation using a third rendering engine.

9. The method of claim 8 further comprising:

identifying a set of visual elements in the plurality of visual elements having a third type;

determining a number of visual elements in the set of visual elements;

when the number of visual elements in the set of visual elements is determined to be not greater than a threshold number of visual elements, rendering the set of visual elements in the first layer of the visual presentation using the first rendering engine;

when the number of visual elements in the set of visual elements is determined to be greater than the threshold number of visual elements and the device is determined to be a mobile computing device, rendering the set of visual elements in the second layer of the visual presentation using the second rendering engine; and when the number of visual elements in the set of visual elements is determined to be greater than the threshold number of visual elements and the device is determined to not be a mobile computing device, rendering the set of visual elements in the second layer of the visual presentation using the third rendering engine.

10. The method of claim 9, wherein the set of visual elements comprises text-based visual elements.

11. The method of claim 10, wherein the set of visual elements are visual elements within the nodes of the hierarchical tree.

12. The method of claim 8, wherein the first rendering engine is a vector-based rendering engine, the second rendering engine is a first raster-based rendering engine, and the third rendering engine is a second raster-based rendering engine.

13. The method of claim 8 further comprising:

determining whether a resolution of a display of the device is less than a threshold resolution amount;

the resolution of the display of the device is determined to be less than the threshold resolution amount, rendering the plurality of nodes of the hierarchical tree in the second layer of the visual presentation using the second rendering engine; and when the device is determined to not be a mobile computing device and the resolution of the display of the device is determined to be not less than the threshold resolution amount, rendering the plurality of nodes of the hierarchical tree in the second layer of the visual presentation using the third rendering engine.

14. The method of claim 13, wherein the second rendering engine is a hypertext markup language 5 (HTML5) rendering engine and the third rendering engine is a hypertext markup language (HTML) rendering engine other than the HTML5 rendering engine.

15. A system comprising:

a set of processing units; and a non-transitory computer-readable medium storing instructions that when executed by at least one processing unit in the set of processing units cause the at least one processing unit to:

receive data associated with a visual presentation comprising a hierarchical tree that includes a plurality of nodes and a plurality of paths connecting the plurality of nodes;

render the plurality of paths of the hierarchical tree in a first layer of the visual presentation using a first rendering engine;

determine whether the system is a mobile computing device;

when the system is determined to be a mobile computing device, render the plurality of nodes of the hierarchical tree in a second layer of the visual presentation using a second rendering engine; and when the system is determined to not be a mobile computing device, render the plurality of nodes of the hierarchical tree in the second layer of the visual presentation using a third rendering engine.

16. The system of claim 15, wherein the instructions further cause the at least one processing unit to:

identify a set of visual elements in the plurality of visual elements having a third type;

determine a number of visual elements in the set of visual elements;

when the number of visual elements in the set of visual elements is determined to be not greater than a threshold number of visual elements, render the set of visual elements in the first layer of the visual presentation using the first rendering engine;

when the number of visual elements in the set of visual elements is determined to be greater than the threshold number of visual elements and the system is determined to be a mobile computing device, render the set of visual elements in the second layer of the visual presentation using the second rendering engine; and when the number of visual elements in the set of visual elements is determined to be greater than the threshold number of visual elements and the system is determined to not be a mobile computing device, rendering the set of visual elements in the second layer of the visual presentation using the third rendering engine.

17. The system of claim 16, wherein the set of visual elements comprises text-based visual elements.

18. The system of claim 15, wherein the first rendering engine is a vector-based rendering engine, the second rendering engine is a first raster-based rendering engine, and the third rendering engine is a second raster-based rendering engine.

19. The system of claim 15, wherein the instructions further cause the at least one processing unit to:

determine whether a resolution of a display of the system is less than a threshold resolution amount;

the resolution of the display of the system is determined to be less than the threshold resolution amount, rendering the plurality of nodes of the hierarchical tree in the second layer of the visual presentation using the second rendering engine; and when the resolution of the display of the system is determined to be not less than the threshold resolution amount, rendering the plurality of nodes of the hierarchical tree in the second layer of the visual presentation using the third rendering engine.

20. The system of claim 19, wherein the second rendering engine is a hypertext markup language 5 (HTML5) rendering engine and the third rendering engine is a hypertext markup language (HTML) rendering engine other than the HTML5 rendering engine.

* * * * *